United States Patent
Chen

(10) Patent No.: US 7,352,666 B2
(45) Date of Patent: Apr. 1, 2008

(54) FOCUS-BALANCE CALIBRATION METHOD

(75) Inventor: Griffen Chen, Taipei (TW)

(73) Assignee: Tian Holdings, LLC, Wilmington, DE (US)

( * ) Notice: Subject to any disclaimer, the term of this patent is extended or adjusted under 35 U.S.C. 154(b) by 631 days.

(21) Appl. No.: 10/894,625

(22) Filed: Jul. 20, 2004

(65) Prior Publication Data

US 2005/0018559 A1  Jan. 27, 2005

(30) Foreign Application Priority Data

Jul. 21, 2003  (TW) .............................. 092119888

(51) Int. Cl.
  *G11B 7/00* (2006.01)
(52) U.S. Cl. ................ 369/44.35; 369/53.28
(58) Field of Classification Search ............ 369/44.26, 369/44.29, 44.35, 53.24, 53.28, 47.27, 44.36
See application file for complete search history.

(56) References Cited

U.S. PATENT DOCUMENTS

| | | | | |
|---|---|---|---|---|
| 5,109,367 A | * | 4/1992 | Yoshikawa | 369/44.36 |
| 5,574,706 A | * | 11/1996 | Verboom et al. | 369/44.26 |
| 6,839,310 B2 | * | 1/2005 | Yoshida | 369/53.11 |
| 6,914,862 B2 | * | 7/2005 | Tsai et al. | 369/53.3 |
| 6,952,382 B2 | * | 10/2005 | Nishiuchi | 369/44.29 |
| 2005/0254362 A1 | * | 11/2005 | Araki | 369/44.27 |

* cited by examiner

*Primary Examiner*—Thang V. Tran

(57) ABSTRACT

Absolute time in pre-groove (ATIP) signals or gain amplification signals corresponding to the ATIP signals for auto gain control (AGC) are used for focus-balance calibration of a blank optical disc. The ATIP signals are obtained in response to the movement of an optical pickup head to different positions. The ATIP signals or gain amplification signals are referred to locate an optimal position of the optical pickup head relative to the blank optical disc, therby accomplishing the focus-balance calibration.

18 Claims, 4 Drawing Sheets

FOCUS-BALANCE CALIBRATION METHOD

FIELD OF THE INVENTION

The present invention relates to a focus-balance calibration method, and more particularly to a method for calibrating the focus balance of a blank optical disc.

BACKGROUND OF THE INVENTION

With the advanced reading and recording speed of an optical disc drive, how to maintain satisfactory reading and recording quality under high reading and recording speed becomes an issue for further research and development. One of the prominent factors affecting the reading and recording quality of an optical disc drive is the focusing performance of the laser pickup head. Since whether the laser of an optical disc drive can be precisely focused on an optical disc and whether the laser reflected by the optical disc can be well received by the optical disc drive highly correlate to the distance between the laser pickup head of the optical disc drive and the optical disc, it is required to keep a well-defined focusing distance for assuring of satisfactory reading and recording quality.

Please refer to FIG. 1A, which schematically shows the distribution of signal receiving zones of an optical pickup head. The optical pickup head 1 includes a main portion 11 consisting of four signal receiving zones A, B, C and D, a first side portion 12 consisting of two signal receiving zones E and F and a second side portion 13 consisting of further two signal receiving zones G and H. When the laser emitted by the optical pickup head 1 is reflected back to the optical pickup head 1 by an optical disc (not shown), the reflected signal is received by the eight signal-receiving zones A~H to generate eight elementary signals, and the eight elementary signals are further processed into an output signal. When the focus f of the optical pickup head 1 precisely falls on the optical disc 2, i.e. in an in-focus state as shown in FIG. 1B, the laser intensity reaching the optical disc 2 will be maximized and the reflected signal is also optimally received by the eight signal-receiving zones A~H. On the other hand, if the optical pickup head 1 is in an out-of-focus state as exemplified in FIG. 1C, the laser power cannot be completely transferred to the optical disc 2 so that both the laser intensity received and reflected by the optical disc 2 becomes insufficient. Accordingly, it is disadvantageous for decoding signals, and thus the signal quality is adversely affected.

Therefore, for assuring of satisfactory signal quality, it is preferred that a focus-balance calibration operation is performed to adjust the distance between the optical pickup head 1 and the optical disc 2 according to practical situations. In general, the optical pickup head 1 is first moved to a preset position, e.g. position P1 of FIG. 1C, to read data stored in the optical disc 2 by processing the laser signal reflected by the optical disc 2 into an RRF or jutter signal. Then, the optical pickup head 1 is up/down moved for a couple of times to obtain more RRF or jutter signals. By analyzing the RRF or jutter signals, an optimal position P2 of the optical pickup head 1 can be located as shown in FIG. 1B. Since the signal processed by the optical pickup head 1 is and RF-type signal, e.g. an EFM (eight-to-fourteen modulation) encoded signal and there are data pre-stored in the optical disc, the focus-balance calibration operation can be readily performed either by directly observing the signal intensities of the reflected signals or detecting the jitters or errors between signals. For example, the signal intensities of the reflected signals can be realized by comparing the peak-to-peak values of the signals.

However, when the optical disc 2 is a blank disc, the optical pickup head 1 cannot generate any EFM encoded signal because of no data being read. Accordingly, no focus-balance calibration operation can be performed for the blank disc. As is understood by those skilled in the art, the reading and recording quality cannot be confirmed, for example before any data being burned into the blank disc, particularly for the optical disc drive having high reading and recording speed.

SUMMARY OF THE INVENTION

Therefore, the present invention provides a method capable of calibrating the focus balance of a blank optical disc.

The present invention provides a method for calibrating the focus balance of a blank optical disc storing therein inherent information comprises steps of: sequentially emitting a plurality of incident optical signals to and then receiving reflected optical signals from the blank optical disc so as to read the inherent information of the blank optical disc on different focusing conditions; generating a plurality of calibration-reference signals in response to the reflected optical signals, wherein different intensities of the calibration-reference signals correspond to different clarity degrees of the read inherent information; and determining an optimal condition according to the focusing conditions and the calibration-reference signals.

For example, the inherent information to be read for focus-balance calibration includes one or more hidden information selected from manufacturer's product code, time label and locked track label.

For example, the incident optical signals and reflected optical signals are laser signals.

In an embodiment, the different focusing conditions correspond to different incident optical lengths, different reflective optical lengths or both.

In an embodiment, each of the reflected optical signals is processed into a plurality of elementary signals, and each of the calibration-reference signals is synthesized with two or more of the elementary signals.

In an embodiment, the calibration-reference signals are low-frequency signals. Preferably, the calibration-reference signals are absolute time in pre-groove (ATIP) signals.

In an embodiment, the optimal condition is determined as one of the focusing conditions, which results in one of the calibration-reference signals with the greatest intensity.

In an embodiment, the optimal condition is determined as a calculated condition occurring between two of the focusing conditions, which result in two of the calibration-reference signals with the greatest intensity.

In an embodiment, the method further comprises a step of mathematically correlating the calibration-reference signals to the focusing conditions to obtain a plot curve, wherein the optimal condition is determined as an condition resulting in the maximum of the plot curve or any of the conditions resulting in a specified range centering around the maximum of the plot curve.

In an embodiment, the blank optical disc is read by an optical pickup head, and the different focusing conditions are different positions of the optical pickup head relative to the blank optical disc.

In an embodiment, the calibration-reference signals are gain amplification signals for auto gain control of absolute time in pre-groove (ATIP) signals.

In an embodiment, the optimal condition is determined as one of the positions of the optical pickup head relative to the blank optical disc, which results in one of the gain amplification signals with the least intensity.

In an embodiment, the optimal condition is determined as an average of two of the positions of the optical pickup head relative to the blank optical disc, which result in two of the gain amplification signals with the least intensity.

In an embodiment, the method further comprises a step of mathematically correlating the gain amplification signals to the positions of the optical pickup head relative to the blank optical disc to obtain a plot curve, wherein the optimal condition is determined as a position resulting in the minimum of the plot curve or any of the positions resulting in a specified range centering around the minimum of the plot curve.

The present invention also provides the use of absolute time in pre-groove (ATIP) signals for focus-balance calibration of a blank optical disc, wherein the ATIP signals are obtained in response to the movement of an optical pickup head to different positions and referred to locate an optimal position of the optical pickup head relative to the blank optical disc.

The present invention also provides the use of gain amplification signals for focus-balance calibration of a blank optical disc, wherein the gain amplification signals are obtained in response to absolute time in pre-groove (ATIP) signals that vary with the movement of an optical pickup head to different positions, and the gain amplification signals are referred to locate an optimal position of the optical pickup head relative to the blank optical disc.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

In general, a blank optical disc, even though having not stored therein any data, is recorded with certain hidden information like a manufacturer's product code, time label and locked track label, etc. In order to achieve the purpose of calibrating the focus balance of a blank optical disc, the information could be read by the optical pickup head, and the resulting signals are analyzed.

Figure 1A:
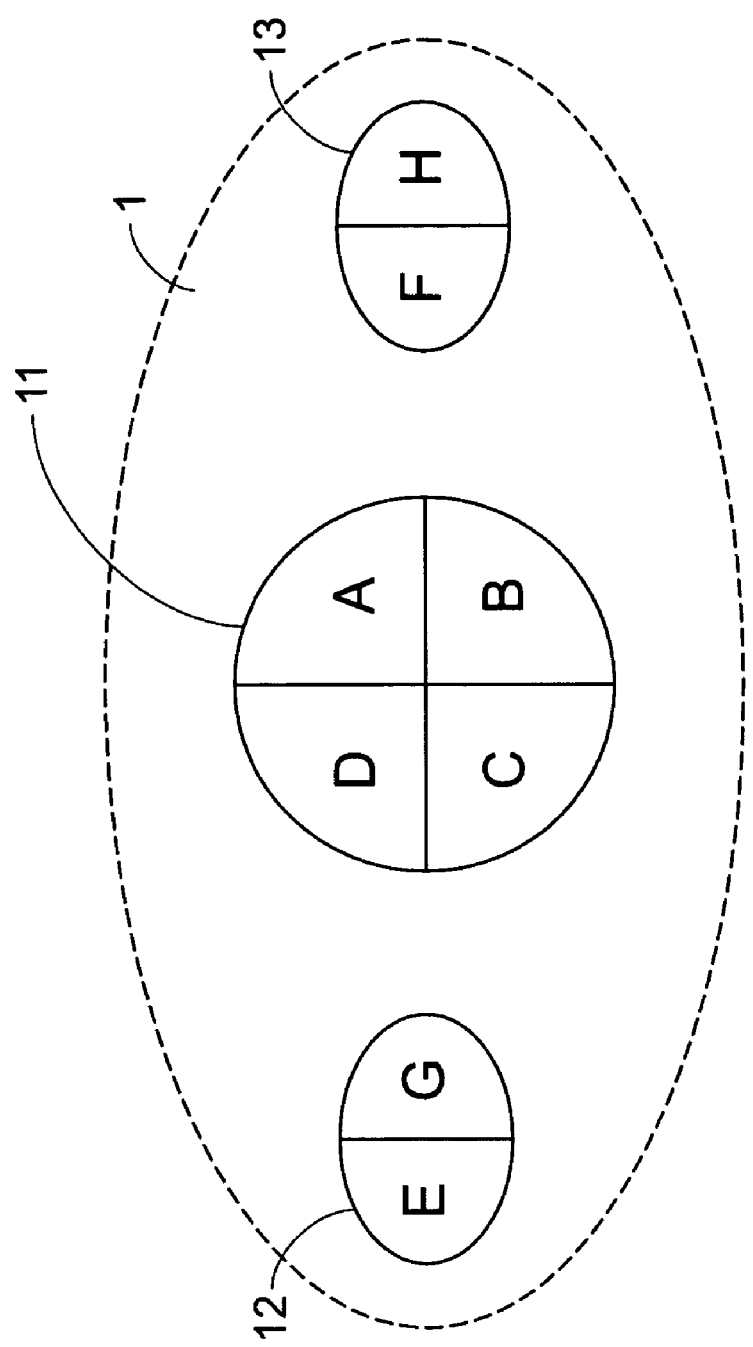
FIG. 1A is a schematic diagram showing the distribution of signal receiving zones of an optical pickup head.
Figure 1C:
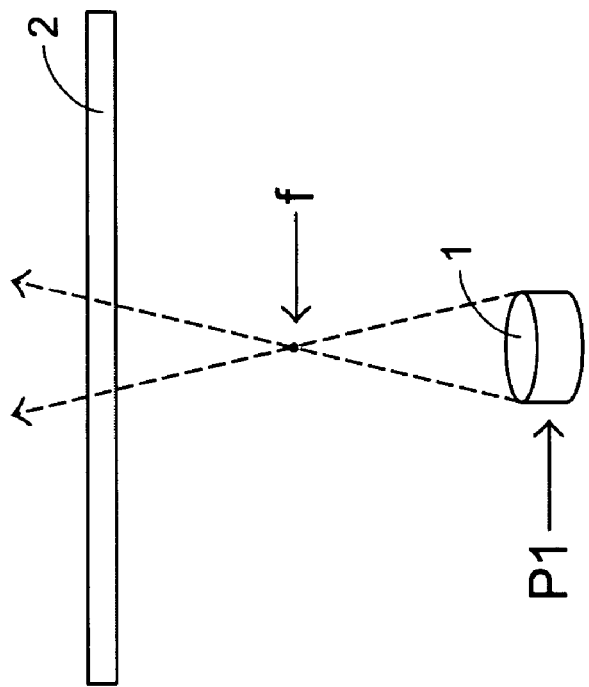
FIGS. 1B and 1C are two diagrams schematically showing an out-of-focus state and an in-focus state occurring between an optical pickup head and an optical disc, respectively.
Figure 1B:
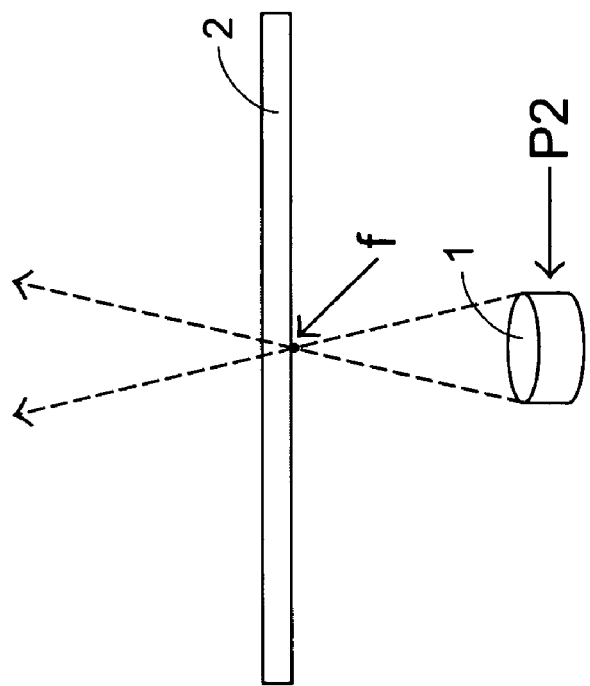

Giving the optical pickup head 1 shown in FIG. 1A as an example, there are eight signal-receiving zones A~H generating eight elementary signals in response to the laser emitted by the optical pickup head and reflected by the optical disc. The eight elementary signals are then processed into an output signal. The output signal, depending on the desired information, is various with different operations or combinations of two or more of the eight elementary signals. For example, the output signal can be an absolute time in pre-groove (ATIP) signal or a tracking error (TE) signal. As is understood to those skilled in the art, the circuit for processing ATIP signals is common to general optical pickup heads, and the ATIP signal itself is a low-frequency signal (about 22.05 KHz) with stable and clear waveforms. Therefore, it is suitable for the present invention to perform the focus balance calibration of blank optical discs thereby.

Figure 2:
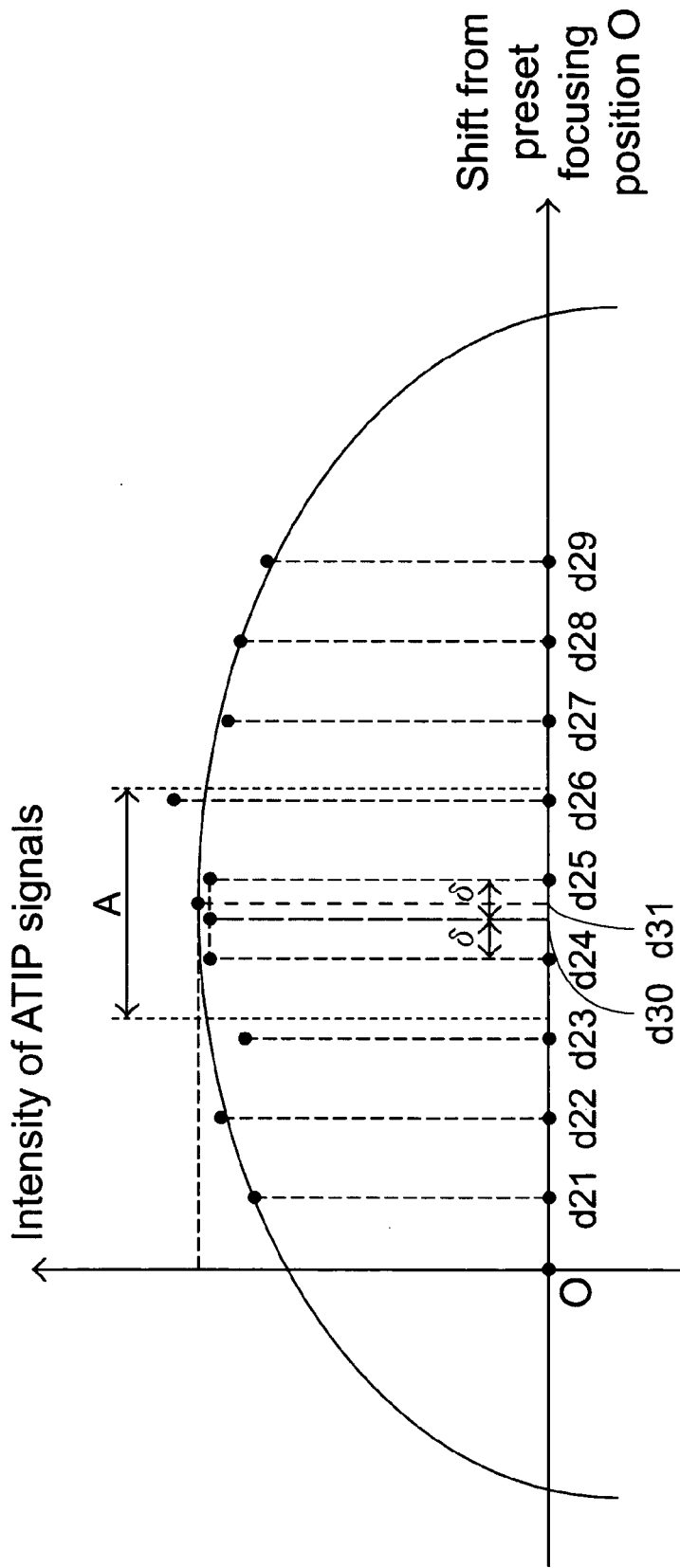
FIG. 2 is a ATIP signal intensity vs. shift from the preset focusing position plot for illustrating the optimal focusing position of an optical pickup head for accessing to a blank optical disc according to an embodiment of the present invention.

According to an embodiment of the present invention, a plurality of ATIP signals generated at different positions of the optical pickup head are analyzed to determine which of these positions is the optimal. First of all, the optical pickup head is moved to a preset focusing position O, and then the optical pickup head is finely up/down tuned around the preset focusing position O so that the optical signals are emitted from different positions and the incident and/or reflected optical length of laser changes accordingly. Then, a plurality of ATIP signals, which are generated in response to the optical signals reflected by the blank optical disc and received by the signal-receiving zones of the optical pickup head, are recorded. The intensities of the ATIP signals differentially reflect the clarity degrees of the preset information of the optical disc read by the optical pickup head. By comparing and analyzing the intensities of the ATIP signals, the optimal position of the optical pickup head for obtaining the optimal focusing performance can be located, thereby achieving the purpose of focus-balance calibration. For example, the optimal position can be the position corresponding to the detected ATIP signal with the greatest intensity, e.g. the position specified as d26 in FIG. 2. Once there are two positions sharing the greatest ATIP signal intensity, the optimal position will be determined as the midst of the two positions, e.g. the position specified as d30 with the same distance δ from d24 and d25 in FIG. 2 with the assumption that d26 is not present or beyond deviation. Alternatively, by plotting a curve of ATIP signal intensity vs. shift from the preset focusing position according to the ATIP signal intensity data of the shifts d21~d29, the optimal position can be determined as the position corresponding to the maximum of the curve, e.g. the position specified as d31 in FIG. 2. In a further example, the optimal position can be any position within a zone where the ATIP intensity change is less than a predetermined level, e.g. the range specified as A in FIG. 2.

Figure 3:
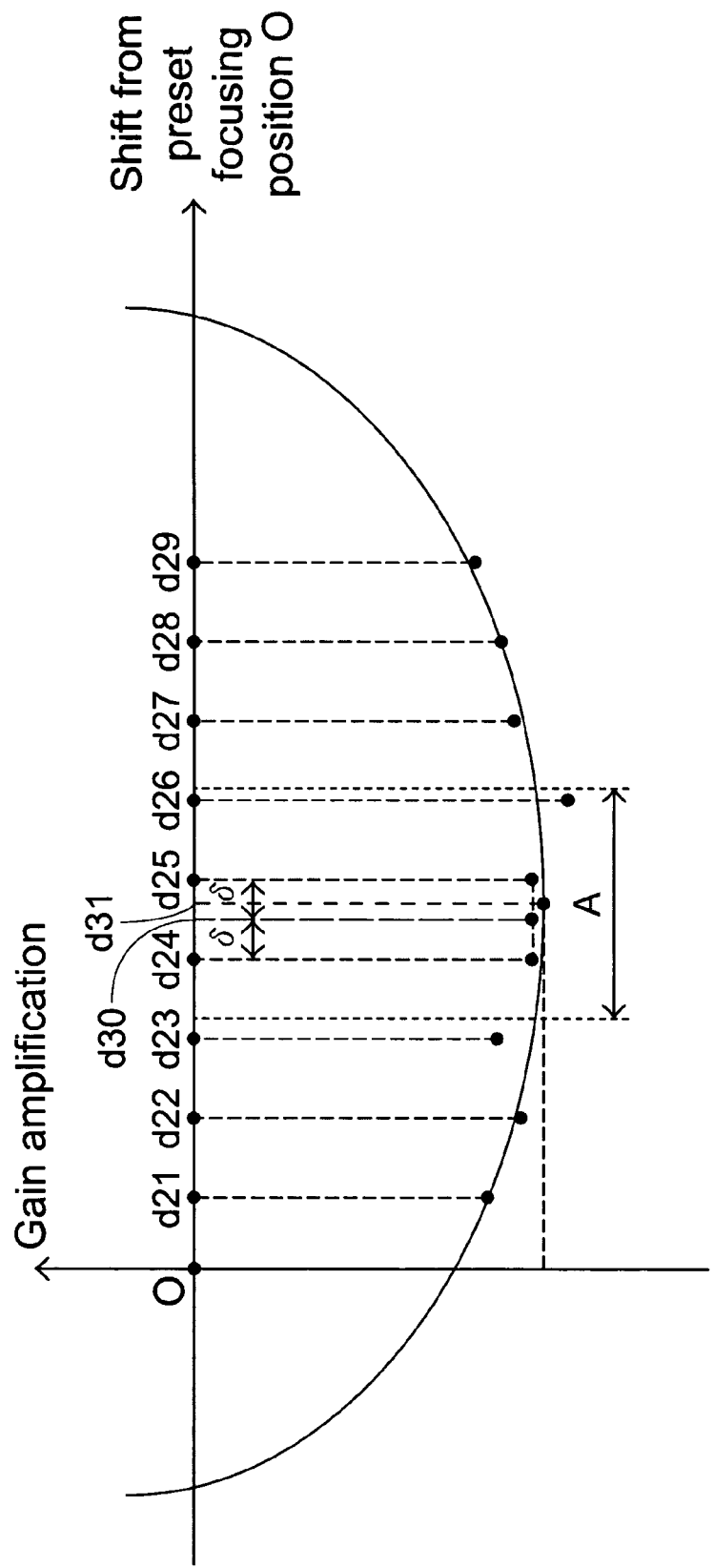
FIG. 3 is a gain amplification vs. shift from the preset focusing position plot for illustrating the optimal focusing position of an optical pickup head for accessing to a blank optical disc according to another embodiment of the present invention.

In another embodiment of the present invention, gain amplification is used in lieu of the ATIP signal intensity to locate the optimal position so as to achieve the purpose of focus-balance calibration. As known to those skilled in the art, the ATIP signals are preferably further processed with auto gain control (AGC) to maintain a uniform gain. In other words, the greater the ATIP signal intensity, the smaller the gain amplification applied to the ATIP signal. Accordingly, the curve of gain amplification vs. shift from the preset focusing position will be complementary to the curve of ATIP signal intensity vs. shift from the preset focusing position, as shown in FIG. 3. Likewise, by comparing and analyzing the gain amplifications applied to the ATIP signals obtained in response to different positions of the optical pickup head, the optimal position of the optical pickup head for obtaining best performance can be located, thereby achieving the purpose of focus-balance calibration. For example, the optimal position can be the position corresponding to the least gain amplification, e.g. the position specified as d26 in FIG. 3. Once there are two positions sharing the least gain amplification, the optimal position will be determined as the midst of the two positions, e.g. the position specified as d30 in FIG. 3 with the assumption that d26 is not present or beyond deviation. Alternatively, the optimal position can be determined as the position corresponding to the minimum of the curve, e.g. the position specified as d31 in FIG. 3. In a further example, the optimal position can be any position within a zone where the gain amplification change is less than a predetermined level, e.g. the range specified as A in FIG. 3.

From the above description, it is understood that the focus-balance calibration of a blank optical disc can be performed according to the inherent information of the optical disc and the well-known ATIP signal. Therefore, no extra manufacturing cost will be incorporated into the optical disc drive for performing the focus-balance calibration of blank optical discs. In addition to the ATIP signal, any other suitable signals synthesized from one or more elementary signals and bear the inherent information of the blank optical disc can also be referred to perform the focus-balance calibration according to the method of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for calibrating the focus balance of a blank optical disc storing therein inherent information, comprising steps of:
    sequentially emitting a plurality of incident optical signals to and then receiving reflected optical signals from said blank optical disc so as to read said inherent information of said blank optical disc on different focusing conditions;
    generating a plurality of calibration-reference signals in response to said reflected optical signals, wherein different intensities of said calibration-reference signals correspond to different clarity degrees of said read inherent information; and
    determining an optimal condition according to said focusing conditions and said calibration-reference signals.

2. The method according to claim 1 wherein said inherent information to be read for focus-balance calibration includes one or more hidden information selected from manufacturer's product code, time label and locked track label.

3. The method according to claim 1 wherein said incident optical signals and reflected optical signals are laser signals.

4. The method according to claim 1 wherein said different focusing conditions correspond to different incident optical lengths.

5. The method according to claim 1 wherein said different focusing conditions correspond to different reflective optical lengths.

6. The method according to claim 1 wherein each of said reflected optical signals is processed into a plurality of elementary signals, and each of said calibration-reference signals is synthesized with two or more of said elementary signals.

7. The method according to claim 1 wherein said calibration-reference signals are low-frequency signals.

8. The method according to claim 1 wherein said calibration-reference signals are absolute time in pre-groove (ATIP) signals.

9. The method according to claim 1 wherein said optimal condition is determined as one of said focusing conditions, which results in one of said calibration-reference signals with the greatest intensity.

10. The method according to claim 1 wherein said optimal condition is determined as a calculated condition occurring between two of said focusing conditions, which result in two of said calibration-reference signals with the greatest intensity.

11. The method according to claim 1 further comprising a step of mathematically correlating said calibration-reference signals to said focusing conditions to obtain a plot curve, wherein said optimal condition is determined as an condition resulting in the maximum of said plot curve.

12. The method according to claim 1 further comprising a step of mathematically correlating said calibration-reference signals to said focusing conditions to obtain a plot curve, wherein said optimal condition is determined as any of the conditions resulting in a specified range centering around the maximum of said plot curve.

13. The method according to claim 1 wherein said blank optical disc is read by an optical pickup head, and said different focusing conditions are different positions of said optical pickup head relative to said blank optical disc.

14. The method according to claim 13 wherein said calibration-reference signals are gain amplification signals for auto gain control of absolute time in pre-groove (ATIP) signals.

15. The method according to claim 14 wherein said optimal condition is determined as one of said positions of said optical pickup head relative to said blank optical disc, which results in one of said gain amplification signals with the least intensity.

16. The method according to claim 14 wherein said optimal condition is determined as an average of two of said positions of said optical pickup head relative to said blank optical disc, which results in two of said gain amplification signals with the least intensity.

17. The method according to claim 14 further comprising a step of mathematically correlating said gain amplification signals to said positions of said optical pickup head relative to said blank optical disc to obtain a plot curve, wherein said optimal condition is determined as a position resulting in the minimum of said plot curve.

18. The method according to claim 14 further comprising a step of mathematically correlating said gain amplification signals to said positions of said optical pickup head relative to said blank optical disc to obtain a plot curve, wherein said optimal condition is determined as any of the positions resulting in a specified range centering around the minimum of said plot curve.

* * * * *